Dec. 11, 1962   C. J. KUNZ   3,067,919
TRANSPORT AND GUIDE MECHANISM
Filed Sept. 16, 1960   2 Sheets-Sheet 1
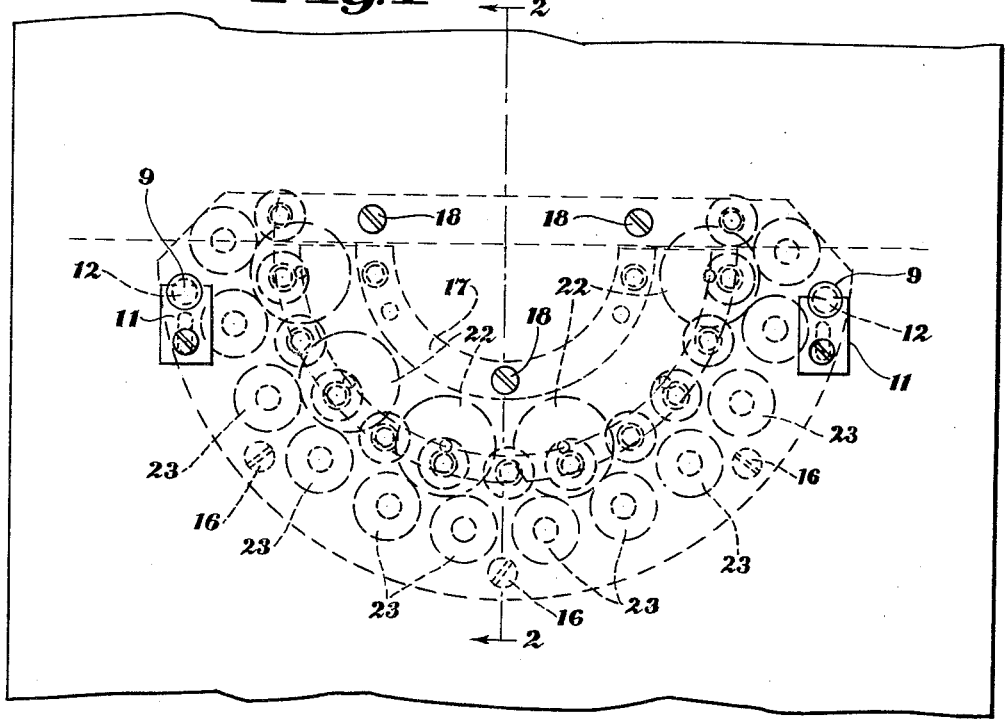
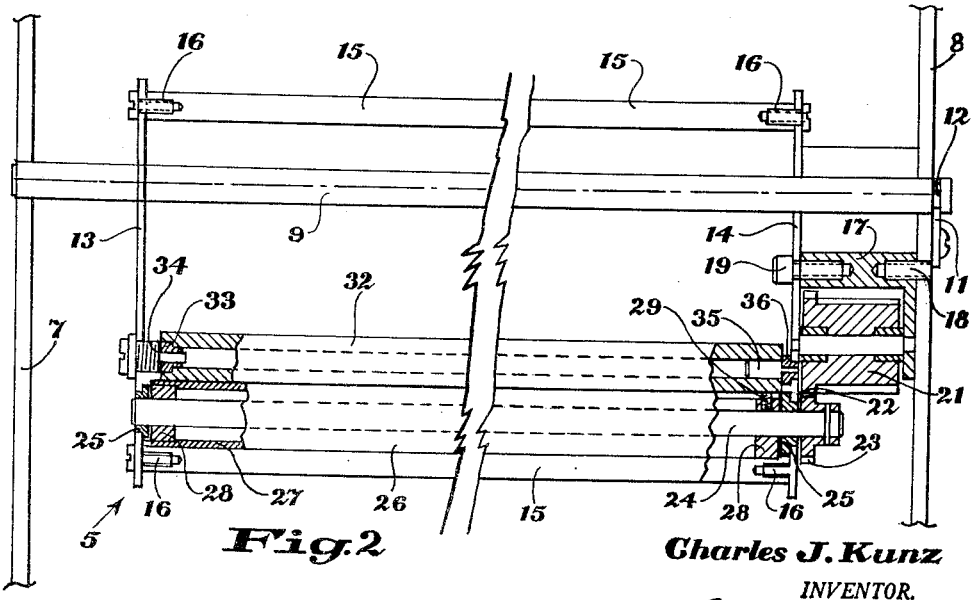
Charles J. Kunz
INVENTOR.

Dec. 11, 1962     C. J. KUNZ     3,067,919
TRANSPORT AND GUIDE MECHANISM
Filed Sept. 16, 1960     2 Sheets-Sheet 2
*Fig. 3*
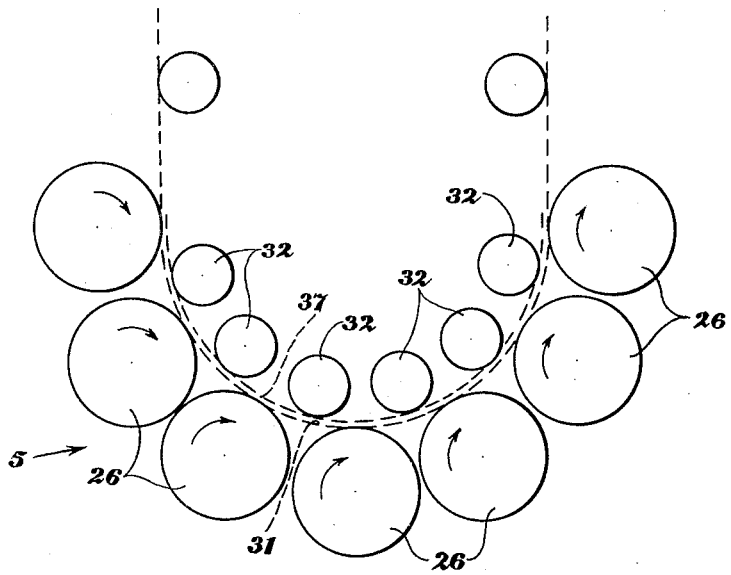
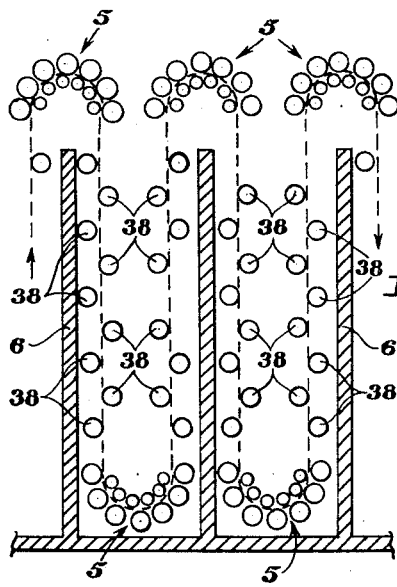
*Fig. 4*
Charles J. Kunz
INVENTOR.

United States Patent Office 3,067,919
Patented Dec. 11, 1962

3,067,919
TRANSPORT AND GUIDE MECHANISM
Charles J. Kunz, Rochester, N.Y., assignor to Eastman Kodak Company, Rochester, N.Y., a corporation of New Jersey
Filed Sept. 16, 1960, Ser. No. 56,456
5 Claims. (Cl. 226—188)

This invention relates generally to transport systems, and more specifically to an improved transport and guide mechanism for changing the direction of travel of a material transported thereby.

In processing machines, dryers, or the like, it is not uncommon for a material being transported therethrough to have its dimensions changed in one way or another; that is elongated in the case of a processing machine and shrunk in the case of a dryer. In machines of this type, transport mechanisms are used for directing the material through the machines, and in those instances where the material passes through the machine in the form of loops, the transport mechanism must, in addition to transporting the material, also guide or change the direction of travel of the material in portions of its travel through some angle up to 180°. In most of the transport and guiding mechanisms of the latter type that applicant is aware of, the material is guided between positively engaged drive and guide rollers located at spaced intervals or stations in the machine, thereby substantially locking the material to the drive rollers at each station. Consequently, if the transported material is expanding or elongating, it will tend to pile up in the regions between the drive rollers, since no slippage of the material is possible at each station. If the material is shrinking, on the other hand, the drive rollers not only prevent slippage of the material, but continue to transport it, thereby subjecting it to excessive tension. The improved transport mechanism of this invention is believed to obviate these disadvantages of prior-known mechanisms.

One of the primary objects of the present invention is to provide an improved transport and guide mechanism for transporting a material through a looped path without positively transporting the material at all times.

Another object of this invention is to provide an improved transport and guide mechanism for transporting a material through a looped path that is of simple design and construction, thoroughly reliable and efficient in operation, and economical to manufacture.

A more specific object of this invention is to provide an improved transport and guide mechanism for transporting a material through a looped path that comprises a non-driven rotatable roller, and a driven roller spaced apart therefrom a predetermined distance.

A still more specific object of this invention is to provide an improved transport and guide mechanism for transporting a material through a curved path that comprises an inner gang of non-driven rotatable rollers, and an outer gang of driven rollers partially encircling the inner gang and spaced apart therefrom a predetermined distance.

Objects and advantages other than those set forth above will be apparent from the following description when read in connection with the accompanying drawings, in which:

FIG. 1 is an end elevation of a transport and guide mechanism in which a preferred form of this invention is embodied;

FIG. 2 is a section view taken along line 2—2 of FIG. 1;

FIG. 3 is a segmental diagrammatic view of the transport and guide mechanism of this invention; and FIG. 4 is a segmental diagrammatic view of a processor incorporating transport mechanisms of this invention.

As shown in the drawings, a transport and guide mechanism 5 of this invention is designed to transport a material along a curved path, in this instance through an angle of 180°, although the path need not be limited to that particular angle. The material referred to may be any web, sheet, or the like having the property of expanding or contracting as it is being transported depending upon the process to which it is subjected. An example of such a material is a photographic film which expands in all directions as it is transported through a film processor. The same film when transported through a dryer will contract or shrink. In most transport systems, a plurality of transport and guide mechanisms 5 are used at spaced intervals along the path of the transported material. Transport and guide mechanisms of the type shown are particularly suited for transporting a material in a looped path through a plurality of adjacent tanks in a processor as seen in FIG. 4. In such an application, the transport and guide mechanisms 5 are alternately mounted at opposite ends of tanks 6, the lower mechanisms 5 adapted to turn the downwardly directed material through an angle of 180°, and direct it upwardly in the direction of the next transport mechanism 5. This mechanism 5 receives the upwardly directed material, turns it through an angle of 180° and transports it downwardly toward the next transport mechanism 5, and so on. Although this is an example of one application of these transport and guide mechanisms 5, it should be understood that these mechanisms are adaptable to other uses and applications.

The transport and guide mechanism 5 as best seen in FIGS. 1 and 2 comprises a pair of spaced-apart frame members 7, 8 secured by rods 9, one end of each rod 9 being fixed to frame member 7, and the opposite end being releasably secured to frame member 8, by a slidable lock plate 11 having a bifurcated end engageable with an annular groove 12 in rod 9. A roller assembly is interposed between frame members 7, 8 and comprises side flanges 13, 14 which are secured together in spaced relation by rods 15 and screws 16. The roller assembly and frame member 8 are secured together through a semicircular bracket 17 interposed between frame member 8 and flange 14, and secured thereto by respective pins 18 and screws 19. The bracket 17 and flange 14 further form a bearing for a plurality of pulleys 21 which are drivingly secured to any suitable drive mechanism, not shown. Each pulley 21 has a gear 22 at one end in driving engagement with a pair of gears 23 pinned to shafts 24 rotatably journaled in bearings 25 carried by flanges 13, 14. A plurality of rollers 26 are rotatably mounted on respective shafts 24, and each roller 26 comprises a cylinder 27 whose ends are mounted on annular disks 28 through which shaft 24 extends. Each roller 26 is secured to its shaft 24 by means of a setscrew 29. The rollers 26 are arranged in a semi-circular pattern for turning the transported material through an angle of 180° in this instance, and the outer peripheries of rollers 26 are engageable by the material and transport the material along an inner path 31 defined by rollers 26, as best seen dotted in FIG. 3. The inner path 31 in this illustration is semi-circular and in engagement with an axially extending peripheral line of each roller 26. The rollers 26 are disposed about and partially encircle a plurality of non-driven guide rollers 32 arranged in a semi-circle, each of which comprises a cylinder having a bearing 33 secured at one end which is rotatably mounted on the end of a pin 34 threadably secured to flange 13. The opposite end of each roller 32 is rotatably supported by a stub shaft 35 having a portion thereof rigidly secured thereto by a press fit, and the remaining portion thereof extending into a bearing 36 carried by side flange 14. These rollers 32 are rotatable but are not driven, and the outer peripheries of rollers 32 define a semi-circular outer path 37 similar to inner path 31 of rollers 26, but spaced apart therefrom a distance greater than the thickness of the material to be transported. These rollers 32 merely aid in establishing the semi-circular path 37 of the material being transported, and will rotate when contacted by the transported material. Although a plurality of rollers 32 are preferred, it should be readily apparent that a single, large diameter, non-driven rotatable roller may be substituted for the plurality of rollers 32.

In the operation of this invention, material which is to be transported through the machine is guided by any suitable means such as rollers 38 seen in FIG. 4 to and from each transport and guide mechanism 5. If, for any reason such as shrinkage, the tensile force to which the transported material is subjected increases above a predetermined value, the material will pull away from outer driven rollers 26 and move into contact with inner non-driven rotatable rollers 32. In this position, transport mechanism 5 does not apply any driving force to the material, and the material is free to move over rollers 32 to relieve any tension build-up therein. When the tensile force to which the transported material is subjected is below the predetermined value, the material merely by its stiffness will move into engagement with outer driven rollers 26 and will be transported thereby.

The invention has been described in detail with particular reference to a preferred embodiment thereof, but it will be understood that variations and modifications can be effected within the spirit and scope of the invention as described hereinabove and as defined in the appended claims.

I claim:

1. In a transport mechanism for transporting and guiding a flexible material which during transport is subjected to a tensile force varying from a predetermined value, the combination comprising: a plurality of non-driven rotatable guide rollers whose peripheries define a first path along which a material is to be guided; and a plurality of driven rollers partially encircling said guide rollers and whose peripheries define a second path along which said material is guided and spaced apart from said first path a distance greater than the thickness of said material whereby said drive rollers apply a driving force to said material for transporting same when the tensile force to which said material is subjected is below said predetermined value, and said material withdraws from at least one of said drive rollers and engages at least one of said guide rollers whereby the driving force applied to the material by said drive rollers decreases when the tensile force is above said predetermined value.

2. Apparatus according to claim 1 wherein the individual driven rollers have a larger diameter than the individual guide rollers.

3. In a transport mechanism for transporting and guiding a material which during transport is subjected to a tensile force varying from a predetermined value, the combination comprising: spaced apart frame members; spaced apart flange members interposed between said frame members; a bracket interposed between one of said frame members and one of said flange members for securing said members together; a plurality of freely rotatable guide rollers carried by said frame members and whose peripheries define a first path along which said material is guided; and a plurality of driven rollers partially encircling said guide rollers and whose peripheries define a second path spaced apart from said first path a distance greater than the thickness of said material whereby said drive rollers apply a driving force to said material for transporting same when the tensile force to which said material is subjected is below said predetermined value, and said material withdraws from at least one of said drive rollers and engages at least one of said guide rollers whereby the driving force applied to the material by said drive rollers decreases when the tensile force is above said predetermined value.

4. The invention according to claim 3 wherein each of said drive rollers has a pinion gear at one end in driving engagement with a plurality of drive gears rotatably supported by said bracket and one of said flange members.

5. In a transport mechanism for a web of flexible material and which provides for variations from a predetermined value of tensile force to which the web is subjected in its passage through the mechanism, the combination comprising:

(A) a set of idler rollers arranged so that the peripheries thereof define a first arcuate path along which said web is to be guided thereby when the tensile force to which said web is subjected is above said predetermined value, and (B) a set of driven rollers arranged so that the peripheries thereof define a second arcuate path along which said web is guided and driven by said driven rollers when the tensile force to which said web is subjected is below said predetermined value, (a) said two sets of rollers being relatively spaced so that said first and second paths defined thereby are separated by an amount substantially greater than the thickness of said web whereby the web engages only one set of rollers at any one time.

References Cited in the file of this patent

UNITED STATES PATENTS

| | | |
|---|---|---|
| 2,326,670 | Patterson | Aug. 10, 1943 |
| 2,492,127 | Hessert | Dec. 20, 1949 |
| 2,537,529 | Hessert et al. | Jan. 9, 1951 |
| 2,938,707 | Allenbaugh | May 31, 1960 |